United States Patent [19]
Wells

[11] 3,818,068
[45] June 18, 1974

[54] REMOVAL OF DEACTIVATED CATALYST SPECIES FROM A HYDROCYANATION PRODUCT FLUID

[75] Inventor: James R. Wells, Orange, Tex.

[73] Assignee: E. I. du Pont de Nemours and Company, Wilmington, Del.

[22] Filed: Jan. 19, 1973

[21] Appl. No.: 325,090

[52] U.S. Cl. .................. 260/465.8 R, 260/439 R
[51] Int. Cl. ........................................ C07c 121/04
[58] Field of Search ................. 260/465.8 R, 439 R

[56] References Cited
UNITED STATES PATENTS
3,676,475   7/1972   Drinkard, Jr. et al. ... 260/465.8 R X Primary Examiner—Joseph P. Brust

[57] ABSTRACT

A process for removing deactivated nickel catalyst species from a hydrocyanation product fluid by heating the product fluid containing the species dissolved therein at a temperature in the range of 90°–175° C. to render the species insoluble in the product fluid and removing the precipitated species from the product fluid.

6 Claims, No Drawings

REMOVAL OF DEACTIVATED CATALYST SPECIES FROM A HYDROCYANATION PRODUCT FLUID

BACKGROUND OF THE INVENTION

In the preparation of the highly important polyamide intermediate, adiponitrile, by hydrocyanation butadiene is reacted with hydrogen cyanide to produce a mixture of branched and linear alkenyl nitriles, the branched alkenyl nitriles are isomerized to linear alkenyl nitriles and the linear nitriles, predominantly 3-pentenenitrile along with 4-pentenenitrile, are further hydrocyanated to produce organic dinitriles, in particular, adiponitrile. In these processes, which are carried out in the presence of certain low valent nickel complexes as described in U.S. Pat. Nos. 3,496,215; 3,496,217; 3,496,218 and 3,536,748, it is frequently necessary particularly in large scale manufacturing operations to recycle unsaturated organic compounds which are unreacted as well as catalyst components to achieve economically acceptable operations. A process for facilitating such recycling operations by extracting and isolating active catalyst components from hydrocyanated products, deactivated catalyst species and catalyst promotor is described in copending U.S. Pat. application Ser. No. 267,106 filed on June 28, 1972 by J. W. Walter.

A complication that has arisen in recovery of unreacted organic compounds and rectifying of reaction products from a hydrocyanation product fluid particularly by distillation is that although some of the deactivated nickel catalyst species are insoluble in the product fluid and can be removed by filtration other deactivated species remain in the product fluid after removal of insoluble material. On subsequent distillation of the product fluid the remaining deactivated catalyst species are precipitated, thus fouling the equipment and markedly reducing the efficiency of the recycling and rectifying operations.

SUMMARY OF THE INVENTION

It has now been found that the difficulties described above can be overcome by subjecting the product fluid obtained from hydrocyanation of an olefinically unsaturated organic compound and which contains soluble deactivated nickel catalyst species to a heat treatment at an elevated temperature. By this treatment deactivated species remaining in the product stream are rendered insoluble and can thereafter be separated from the product fluid by filtration, centrifugation, settling or other suitable techniques. The duration of heat treatment for effecting insolubilization of the deactivated species is not especially critical. To provide an insolubilized material which can be readily separated from the product fluid by conventional techniques the heat treatment in general is maintained for a period of at least about two hours. The heat treatment is conveniently carried out at atmospheric pressure at a temperature in the range of 90° – 150° C. but it can also be carried out under superatmospheric pressure at temperatures ranging up to about 175° C. For large scale operations the heat treatment of the product fluid is normally carried out in an inert atmosphere such as nitrogen.

The process of this invention can be carried out in any suitable apparatus or equipment such as a hold tank or other vessel, the important consideration being that the product stream be brought to the required temperature to insolubilize the deactivated species contained therein.

In a typical embodiment of this invention the product fluid is one obtained by hydrocyanation of an olefinically unsaturated compound such as 3-pentenenitrile or 4-pentenenitrile in the presence of a zero-valent nickel complex of an organic phosphorus compound of the formula $PZ_3$ wherein Z is defined as OR and R is an aryl radical having up to 18 carbon atoms along with a compound containing a cation of a metal as a catalyst promoter, as is described in U.S. Pat. No. 3,496,217. Typical organic phosphorus compounds of the formula $PZ_3$ include triphenyl phosphite, tri-(m-tolyl)phosphite, tri-(p-tolyl)phosphite and tri-(mixed m- and p-tolyl)phosphites. As disclosed in U.S. Pat. No. 3,496,217, the catalyst promoter is a compound containing a cation of a metal selected from the group consisting of zinc, cadmium, berylium, aluminum, gallium, indium, silver, titanium, zirconium, hafnium, germanium, tin, vanadium, niobium, scandium, chromium, molydenum, tungsten, manganese, rhenium, palladium, thorium, erbium, iron and cobalt, or mixtures thereof. Of these, zinc, cadmium, aluminum, titanium, chromium, tin and vanadium as their halides (chloride, bromide, iodide) are preferred. The product fluid may also contain catalyst moieties arising from the precursory hydrocyanation of butadiene to mixed alkenyl nitriles and isomerization of the branched alkenyl nitriles to linear nitriles such as 3-pentenenitrile.

An advantage of the process of this invention is that the liquid components of the product fluid, such as the hydrocyanated products and unsaturated compounds which are unreacted, can be recovered by distillation for further rectification or recycling and the deactivated nickel catalyst species can be isolated essentially free of catalyst promoter and in more concentrated form for efficient reclaiming operations.

DESCRIPTION OF PREFERRED EMBODIMENTS

In a preferred embodiment of this invention a product fluid obtained by hydrocyanation of an unsaturated organic compound such as 3-pentenenitrile or 4-pentenenitrile in the presence of a zero-valent nickel complex of an organic phosphorus compound such as a triaryl phosphite along with a catalyst promoter such as zinc halide or other metal halide is first extracted with a hydrocarbon solvent to form a multi-phase mixture, as is described in U.S. Pat. Ser. No. 267,106. The hydrocarbon phase containing predominantly the organic phosphorus compounds and their zero-valent nickel complexes is separated from the mixture for recycling to the hydrocyanation process. The remainder of the mixture, containing organic dinitrile products, unreacted organic mononitriles, metal halide promoter and deactivated nickel catalyst, after optional filtration to remove any insoluble catalyst species, is then subjected to heating preferably under atmospheric pressure and at a temperature in the range of 100° – 125° C. whereby the deactivated but still soluble nickel catalyst species are rendered insoluble in the product fluid. As is described in U.S. Pat. Ser. No. 267,106 the hydrocarbon solvents include paraffins and cycloparaffins having a boiling point in the range of about 30° C. to about 135° C. Typical solvents include n-pentane, n-hexane, n-heptane, and n-octane as well as the corresponding branched chain paraffin hydrocarbons having a boiling point within the range specified. Cyclic hydrocarbons include cyclopentane, cyclohexane, and cycloheptane as well as alkyl substituted cycloparaffins having a boiling point within the specified range. Mixtures of solvents may also be used such as, for example, mixtures of the solvents noted above or commercial heptane which contains a number of hydrocarbons in addition to n-heptane.

The invention is more fully illustrated in the examples to follow.

EXAMPLES

EXAMPLE 1

A 1,000 gram sample of product fluid obtained from hydrocyanation of 3-pentenenitrile in the presence of a zero-valent nickel complex of a triaryl phosphite comprising a mixture of predominantly meta- and para-tolyl phosphites and a zinc chloride promoter was filtered to remove solid material. The filtered solids were washed with benzene, vacuum dried and found to weigh 2.32 grams. A portion (322 grams) of the liquid filtrate was heated to 100° C. in a flask and held at that temperature for one hour, then solid material which precipitated from the liquid was filtered, the solid was washed with benzene and dried as described above. The dried deactivated nickel catalyst species weighed 1.2 grams. The solid material originally separated from the product fluid corresponding to 0.23 percent by weight. The additional solid material precipitated from the product fluid by heating corresponded to 0.37 percent by weight.

EXAMPLE 2

A 171 gram sample of product fluid similar to that described in Example 1 but which had been extracted with cyclohexane in the manner described in U.S. Pat. Ser. No. 267,106 and filtered to remove solid material, was heated in a beaker to 119° C. for 20 minutes. The amount of deactivated nickel catalyst species precipitated by the heat treatment weighed 4.5 grams before removal of adsorbed liquid.

EXAMPLE 3

A 357 gram sample of product fluid similar to that described in Example 2 was heated to 100° C. and held at that temperature for 2 hours. The precipitated material was filtered, washed with benzene, and vacuum dried. The solid weighed 0.715 grams, corresponding to 0.2 percent by weight of the product fluid.

To determine if insolubilization of the nickel species was essentially completed in the above heat treatment, a 273 gram sample of the filtrate was charged to the pot of a spinning band still and heated to 173° C. Only a small amount of additional solid (0.03 grams) product was obtained, indicating that insolubilization by the original heat treatment was substantially complete.

In large scale hydrocyanation operations in which product fluid similar to that described in Examples 2 and 3 and which had been subjected to the prescribed heat treatment under nitrogen atmosphere and further carried through recycling operations, continuous distillation of the product fluid to reclaim unreacted olefinic compounds as well as hydrocyanated products was carried on without plugging the distillation equipment for a period at least four times longer than when the product fluid was not subjected to the heat treatment. The advantage of employing the process of this invention is thus clearly evident.

EXAMPLE 4

A 327 gram sample of product fluid similar to that described in Example 2 was heated to 100° C. and held at that temperature for three hours. The amount of precipitated material weighed 0.722 gram, corresponding to 0.22 percent by weight of the product fluid. The solid was analyzed and found to contain 20 percent nickel and 7 percent zinc.

I claim:

1. In a process of hydrocyanating an olefinically unsaturated organic compound selected from the group consisting of 3-pentenenitrile and 4-pentenenitrile in the presence of a nickel catalyst species consisting essentially of a zerovalent nickel complex of an organic phosphorus compound of the formula $PZ_3$, wherein $PZ_3$ is an organic phosphorus compound of the group consisting of triphenyl phosphite, tri(m-tolyl)phosphite, tri(p-tolyl)phosphite and tri(mixed m- and p-tolyl)phosphites, and a catalyst promoter, the promoter being a compound containing a cation of a metal selected from the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt and mixtures thereof and an anion selected from the group consisting of chloride, bromide and iodide, wherein during the process of hydrocyanating a portion of the nickel catalyst species becomes deactivated; producing a product fluid containing organic dinitriles, unreacted organic mononitriles, organic phosphorus compounds of the group consisting of $PZ_3$ and zerovalent nickel complexes of $PZ_3$, catalyst promoter and the deactivated nickel catalyst species; and recovering the liquid components of the product fluid;

the improvement which comprises heating the product fluid at a temperature in the range of 90°–175° C. for a time sufficient to render the deactivated nickel catalyst species contained therein insoluble in the product fluid and separating the insoluble nickel catalyst species from the product fluid.

2. The process of claim 1 wherein the catalyst promoter is a compound containing a cation of a metal of the group consisting of zinc, cadmium, aluminum, titanium, chromium, tin and vanadium.

3. The process of claim 2 wherein the product fluid is contacted in an extractor at a temperature in the range of about 0° C. to about 100° C. with a hydrocarbon solvent of the group consisting of paraffin and cycloparaffin hydrocarbons and mixtures thereof having a boiling point in the range of about 30° C. to about 135° C. to form a multiphase mixture wherein the hydrocarbon solvent phase contains predominantly the organic phosphorus compounds and their zero-valent nickel complexes, separating the hydrocarbon solvent phase from the multiphase mixture and thereafter heating the remaining product fluid at a temperature in the range of 90° – 175° C. to render the deactivated nickel catalyst species contained therein insoluble in the product fluid and separating the insolubilized nickel species from the product fluid.

4. The process of claim 3 wherein the product fluid is heated under atmospheric pressure at a temperature in the range of 90° – 150° C. to render insoluble the deactivated nickel catalyst species.

5. The process of claim 4 wherein the temperature is maintained in the range of 100° – 125° C.

6. The process of claim 5 wherein $PZ_3$ is a mixture of tri-(meta- and para-tolyl)phosphites.

* * * * *